(12) United States Patent
Chen et al.

(10) Patent No.: US 7,443,662 B2
(45) Date of Patent: Oct. 28, 2008

(54) MOUNTING APPARATUS FOR POWER SUPPLY

(75) Inventors: Yun-Lung Chen, Tu-Cheng (TW); Da-Long Sun, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 383 days.

(21) Appl. No.: 11/268,121

(22) Filed: Nov. 7, 2005

(65) Prior Publication Data

US 2006/0139865 A1    Jun. 29, 2006

(30) Foreign Application Priority Data

Dec. 25, 2004   (CN) .................... 2004 2 1035071 U

(51) Int. Cl.
 *H05K 7/12* (2006.01)
(52) U.S. Cl. ..................... 361/683; 361/685; 312/223.2
(58) Field of Classification Search ................. 361/683, 361/385; 312/223.2
 See application file for complete search history.

(56) References Cited

U.S. PATENT DOCUMENTS

| 5,777,848 | A  | * | 7/1998 | McAnally et al. | ........... 361/725 |
| 6,288,901 | B1 |   | 9/2001 | Liu et al. | |
| 6,549,424 | B1 | * | 4/2003 | Beseth et al. | ................ 361/801 |
| 6,685,503 | B1 | * | 2/2004 | Huang et al. | ................ 439/527 |

* cited by examiner

*Primary Examiner*—Lisa Lea-Edmonds
*Assistant Examiner*—Ingrid Wright
(74) *Attorney, Agent, or Firm*—Morris, Manning & Martin LLP; Tim Tingkang Xia

(57) ABSTRACT

A mounting apparatus for a power supply (10) includes a chassis (20), a plurality of sliding members (11) adapted to attach to the power supply and a fastener member (30) pivotably secured on the chassis. The chassis includes a support panel (27) and a rear panel (21) with a plurality of apertures (23) defined therein. The fastener member comprises a clasp (352). The power supply is put on the support panel with the plurality of sliding members engaged in the plurality of apertures of the rear panel, the fastener member is rotated with the clasp of the fastener member engaging with the rear panel, the fastener member is fastened on the rear panel to restrict vertical movement of the power supply.

16 Claims, 4 Drawing Sheets

MOUNTING APPARATUS FOR POWER SUPPLY

BACKGROUND OF THE INVENTION

1. Field of the Invention

The present invention relates to a mounting apparatus, and more particularly to a mounting apparatus for a power supply in a computer chassis.

2. General Background

Low-voltage direct current power is required for electronic components in a computer, such as a mother board, a hard disk drive. A power supply is often mounted in a computer chassis for converting alternating current to direct current and supplying the direct current to the computer.

A conventional computer chassis adapted for mounting a power supply includes a rear panel which forms an opening thereof to expose the power supply. A plurality of holes are defined proximate the opening for extension of screws to fix the power supply on the computer chassis. However, when the power supply needs to be attached to or detached from the computer chassis, a screwdriver is needed to drive the screws in or off the holes defined in the power supply. The course is boring and time-consuming.

What is needed, therefore, is a mounting apparatus for a power supply to be attached to and removed from the chassis conveniently.

SUMMARY

A mounting apparatus for a power supply in accordance with a preferred embodiment of the present invention includes a chassis, a plurality of sliding members adapted to attach to the power supply and a fastener member pivotably secured on the chassis. The chassis includes a support panel and a rear panel with a plurality of apertures defined therein. The fastener member comprises a clasp. The power supply is put on the support panel with the plurality of sliding members engaged in the plurality of apertures of the rear panel, the fastener member is rotated with the clasp of the fastener member engaging with the rear panel, the fastener member is fastened on the rear panel to restrict vertical movement of the power supply.

Other objects, advantages and novel features of the invention will become more apparent from the following detailed description when taken in conjunction with the accompanying drawings, in which:

DETAILED DESCRIPTION OF THE INVENTION

Figure 1:
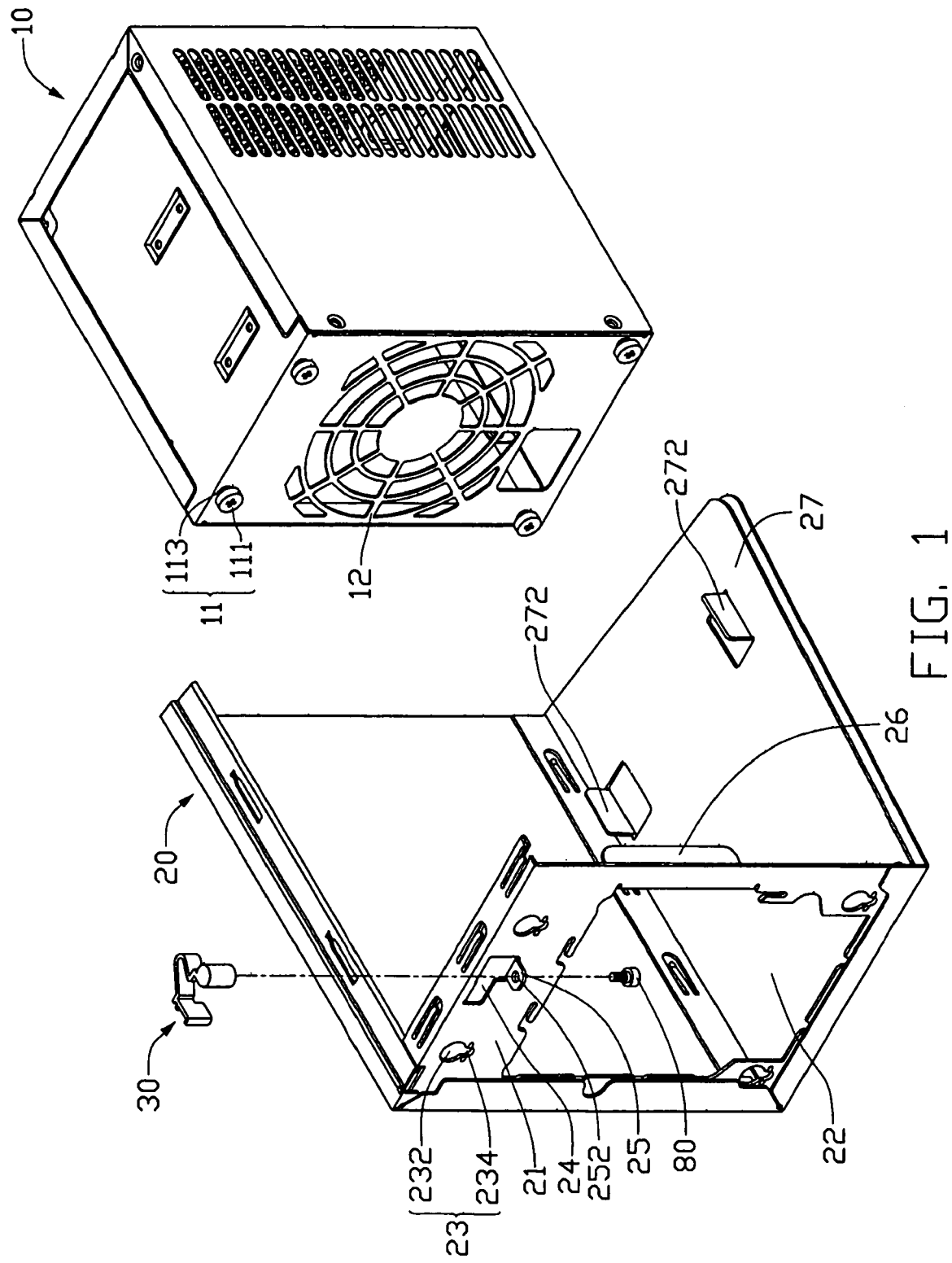
FIG. 1 is an exploded, isometric view of a preferred embodiment of a mounting apparatus for a computer power supply, the mounting apparatus including a fastener member.

Referring to FIG. 1, a mounting apparatus for mounting a power supply 10 in an electronic device like a computer in accordance with a preferred embodiment of the present invention includes a chassis 20 and a fastener member 30. The chassis 20 includes a rear panel 21 and a support panel 27 for supporting a power supply 10 thereon.

An air grill is formed on a rear wall of the power supply 10. Four sliding members 11 used as first engagement means are secured at four corners of the rear wall of the power supply 10. The sliding member 11 includes a head 111 and a shank 113 exposed outside the rear wall of the power supply 10. A distance between the head 111 and the rear wall of the power supply 10 is adapted to engage in a hole defined in the rear panel 21.

The chassis 20 is partially shown in FIG. 1. The support panel 27 forms a pair of positioning pieces 272 thereon.

The rear panel 21 of the chassis 20 defines an opening 22 corresponding to the air grill of the power supply 10. A positioning flange 26 is extended from an edge of the opening 22. Four apertures 23 used as second engagement means are defined adjacent four corners of the opening 22 corresponding to the four sliding members 11 of the power supply 10. Each aperture 23 includes an upper larger hole 232 and a lower smaller hole 234 in communication with the larger hole 232. The dimension of the larger hole 232 is larger than that of the head 111 of the sliding member 11, for allowing the head 111 to extend therethrough. The dimension of the smaller hole 234 is smaller than that of the head 111, and slightly larger than that of the shank 113. A pair of teeth (not labeled) are formed at opposite edges of the smaller hole 234 so as to provide elastically snapping force on anything accommodated in the smaller hole 234. The rear panel 21 defines a slot 24 above the opening 22. A tab 25 extends perpendicularity from an edge of the slot 24. A hole 252 is defined in the tab 25.

Figure 2:
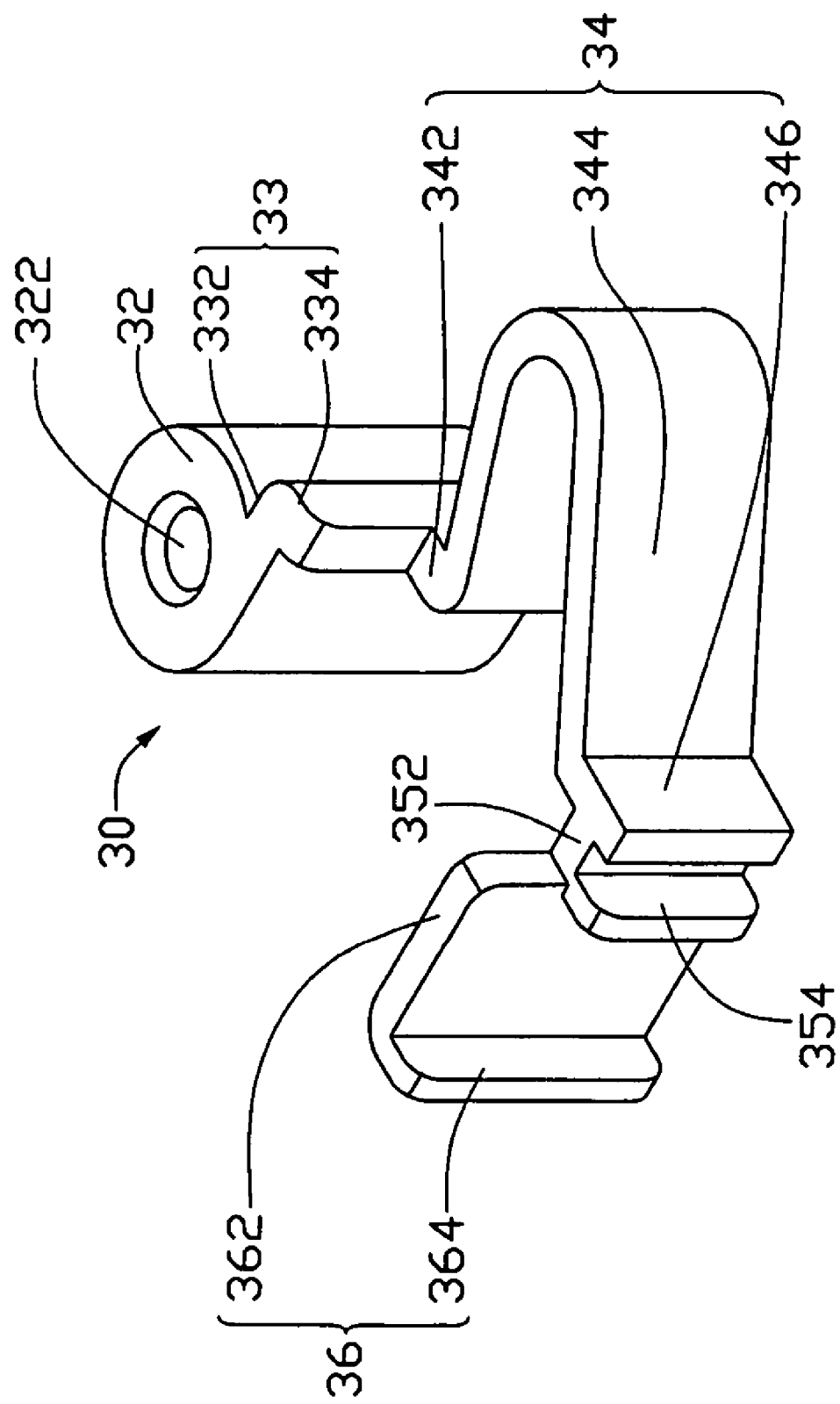
FIG. 2 is an isometric view of the fastener member in FIG. 1.

Referring to FIG. 2, the fastener member 30 is generally an "n" shaped member. The fastener member 30 includes a rotating portion 32, an operating portion 36 and an elastic portion 34 connecting the rotating portion 32 and operating portion 36 together. The elastic portion 34 includes an "n" shaped elastic piece 344, a first foot 342 and a second foot 346. The first foot 342 and the second foot 346 are formed at two ends of the elastic piece 344. The rotating portion 32 connects with the first foot 342 directly, and the operating portion 36 connects with the second foot 346 by a clasp 352. The clasp 352 has a securing groove 354 defined therein. The rotating portion 32 defines a screw hole 322 therein. The operating portion 36 includes a base 362 with a flange 364 extending perpendicular from an edge of the base 362.

Figure 3:
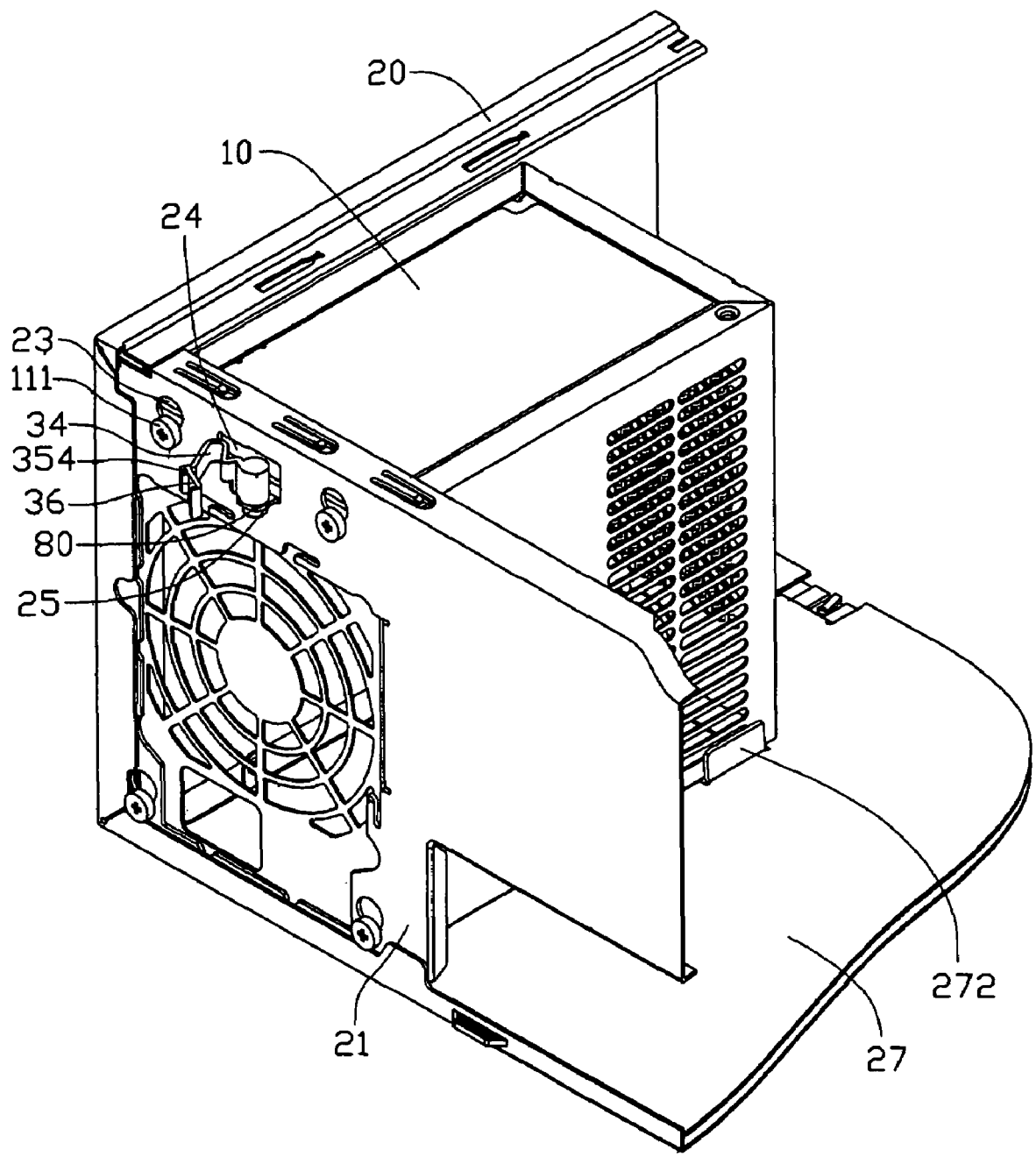
FIG. 3 is an pre-assembled view of FIG. 1.
Figure 4:
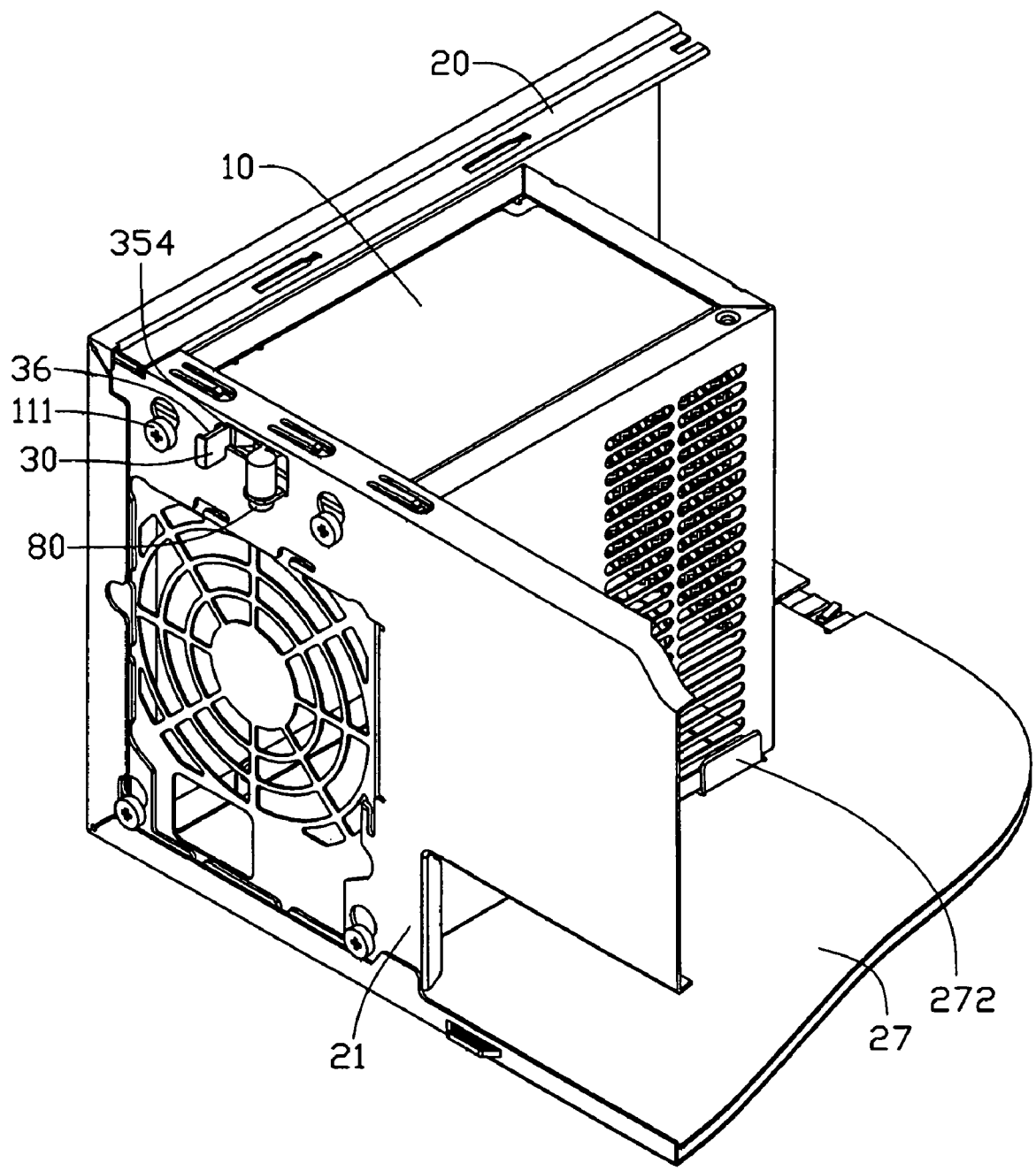
FIG. 4 is an assembled view of FIG. 1 with the power supply mounted thereof.

Referring to FIGS. 3 and 4, in assembly, the fastener member 30 is installed on the tab 25 with the securing hole 322 of the fastener member 30 aligning with the hole 252 of the tab 25. A screw 80 secures the fastener member 30 on the tab 25. The fastener member 30 can be pivoted about the screw 80. The fastener member 30 corresponds to the slot 24 of the rear panel 21, and can be rotated to extend therethrough and projects into the chassis 20.

Then, the power supply 10 is put in the chassis 20. The power supply 10 is moved toward the rear panel 21. The heads 111 of the sliding members 11 extend through the larger holes 232 of the rear panel 21 respectively, and the shanks 113 of the sliding members 11 are received in the larger holes 232. Then, the shanks 113 of the sliding members 11 are slid downwardly into the smaller holes 234 of the rear panel 21. At the same time, the power supply 10 is supported on the support panel 27, and the positioning flange 26 and positioning pieces 272 resist the power supply 10.

The operating portion 36 of the fastener member 30 is pressed, and the elastic portion 34 of the fastener member 30 is elastically compressed. The fastener member 30 is rotated to extend through the slot 24 until an edge of the slot 24 is received in the securing groove 354 of the fastener member 30. The fastener member 30 is secured on the chassis 20 with the elastic portion 34 of the fastener member 30 extending into the chassis 20 and restricting the power supply 10 to be moved upwardly. The power supply 10 is secured in the chassis 20, and restricted from movement in any directions.

In disassembly, the operating portion 36 is deformed to disengage the clasp 352 of the fastener member 30 from the edge of the slot 24. The fastener member 30 is rotated out of the slot 24, and the elastic portion 34 of the fastener member 30 does not restrict the power supply 10 any more. The power supply 10 is moved upwardly with the sliding members 11 sliding from the smaller holes 234 to the larger holes 232 of the rear panel 21. Then, the power supply 10 is moved forward with the sliding members 11 escaping from the larger holes 232. The power supply 10 is disassembled from the chassis 20.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A mounting apparatus for a power supply comprising:
   a chassis comprising a support panel and a rear panel with a plurality of apertures defined therein;
   a plurality of sliding members adapted to attach to the power supply; and
   a fastener member pivotably secured on the chassis, the fastener member comprising a clasp;
   wherein the power supply is put on the support panel with the plurality of sliding members engaged in the plurality of apertures of the rear panel, the fastener member is rotated with the clasp of the fastener member engaging with the rear panel, the fastener member is fastened on the rear panel to restrict vertical movement of the power supply; and
   wherein the fastener member comprises a rotating portion, an operating portion and an elastic portion connecting the rotating portion and the operating portion together.

2. The mounting apparatus as described in claim 1, wherein the aperture comprises a larger hole and a smaller hole in communication with the larger hole.

3. The mounting apparatus as described in claim 2, wherein the sliding member comprises a head and a shank adapted to engage in the smaller hole.

4. The mounting apparatus as described in claim 1, wherein a slot is defined in the rear panel.

5. The mounting apparatus as described in claim 1, wherein the elastic portion comprises an elastic piece, a first foot connecting with the rotating member, and a second foot connecting with the operating portion.

6. The mounting apparatus as described in claim 5, wherein the clasp is formed between the second foot and the operating portion.

7. The mounting apparatus as described in claim 1, wherein a plurality of positioning flanges and positioning pieces are formed from the support panel and the rear panel.

8. A computer comprising:
   a power supply;
   a chassis comprising a support panel for supporting the power supply and a rear panel with a slot defined therein; and
   a fastener member pivotably secured on the chassis, the fastener member comprising a clasp;
   wherein after the power supply is put on the support panel, the fastener member is rotated to extend through the slot until the clasp engages with the rear panel, thereby restricting upward movement of the power supply; and
   wherein a securing groove is defined in the clasp.

9. The computer as described in claim 8, wherein a plurality of apertures is defined in the rear panel, and a plurality of sliding members is adapted to attach to the power supply to engage in the plurality of apertures.

10. The computer as described in claim 9, wherein the aperture comprises a larger hole and a smaller hole in communication with the larger hole.

11. The computer as described in claim 10, wherein the sliding member comprises a head and a shank adapted to engage in the smaller hole.

12. The computer as described in claim 8, wherein the fastener member comprises a rotating portion, an operating portion and an elastic portion connecting the rotating portion and the operating portion together.

13. The computer as described in claim 12, wherein the elastic portion comprises an elastic piece, a first foot connecting with the rotating member, and a second foot connecting with the operating portion.

14. The computer as described in claim 8, wherein a plurality of positioning flanges and positioning pieces are formed from the support panel and the rear panel.

15. An electronic device comprising:
   a power supply comprising at least one first engagement means formed at a side wall thereof;
   a chassis enclosing said electronic device therein and comprising an opening formed at a side panel thereof so as to expose said wall of said power supply therefrom when said wall of said power supply abuts against said panel of said chassis, a second engagement means corresponding to each of said at least one first engagement means formed at said panel of said chassis so as to be movably engagable with said each of said at least one first engagement means when said side of said power supply moves against said panel of said chassis, said power supply exclusively movable along a parallel direction to said panel of said chassis under engagement of said first and second engagement means between a first position thereof where said power supply is restrained by said engagement of said first and second engagement means from moving away from said panel of said chassis and a second position thereof where said power supply is releasably movable away from said panel of said chassis; and
   a fastener member pivotally attachable to one of said wall of said power supply and said panel of said chassis, and releasably engagable with the other of said wall of said power supply and said panel of said chassis so as to restrain said power supply from moving from said first position thereof to said second position thereof;
   wherein said fastener member comprises a rotating portion, an operating portion and an elastic portion connecting said rotating portion and said operating portion together, said elastic portion is at one side of said panel of said chassis, and said operation portion and said rotating portion are at the other side of said panel of said chassis when said fastener member engages with the other of said wall of said power supply and said panel of said chassis.

16. The electronic device as described in claim 15, wherein said fastener member comprises a clasp to releasably snap said other of said wall of said power supply and said panel of said chassis when said fastener member rotates toward said other of said wall of said power supply and said panel of said chassis.

* * * * *